United States Patent
Randall

[11] 3,766,021
[45] Oct. 16, 1973

[54] PROCESS AND APPARATUS FOR FRACTIONATOR REBOILING WITH MINIMIZED FOULING BY CENTIFUGING AND DECANTING

[75] Inventor: John H. Randall, Bartlesville, Okla.

[73] Assignee: Phillips Petroleum Company, Bartlesville, Okla.

[22] Filed: May 3, 1971

[21] Appl. No.: 139,455

[52] U.S. Cl. .............. 203/39, 203/47, 208/358, 260/683.47, 261/8, 202/153
[51] Int. Cl. .............................................. C07c 3/52
[58] Field of Search ............... 203/39, 47; 202/153, 202/163, 181, 158; 261/7, 8; 208/348, 358; 196/100, 139; 260/683.47

[56] References Cited
UNITED STATES PATENTS

| | | | |
|---|---|---|---|
| 2,795,536 | 6/1957 | Grossberg et al. | 202/153 |
| 3,321,547 | 5/1967 | Banks | 260/683.47 |
| 3,227,776 | 6/1966 | Ross | 260/683.47 |
| 3,425,935 | 2/1969 | Cuhn | 208/348 |
| 3,119,764 | 1/1964 | Cabbage | 202/153 |
| 2,787,451 | 4/1957 | Lavery | 261/8 |
| 3,442,767 | 5/1969 | Hall | 202/153 |
| 3,230,158 | 1/1966 | Molique | 203/98 |
| 2,398,213 | 4/1946 | Dutson et al. | 196/100 |
| 2,534,173 | 12/1950 | Kraft | 202/153 |
| 3,233,879 | 2/1966 | Mitchell | 202/158 |

*Primary Examiner*—Wilbur L. Bascomb, Jr.
*Attorney*—Young & Quigg

[57] ABSTRACT

Process and apparatus for minimizing reboiler fouling wherein a liquid effluent from the lower zone of the fractionator is charged to a first compartment of the fractionator bottom section with a heavier fouling component phase being separated and removed from a lighter hydrocarbon phase. The lighter hydrocarbon phase is decanted from the first compartment by overflowing into a second compartment and removed to an external reboiler wherein it is vaporized, at least in part, before being returned to the fractionator lower zone.

6 Claims, 1 Drawing Figure

Patented Oct. 16, 1973
3,766,021
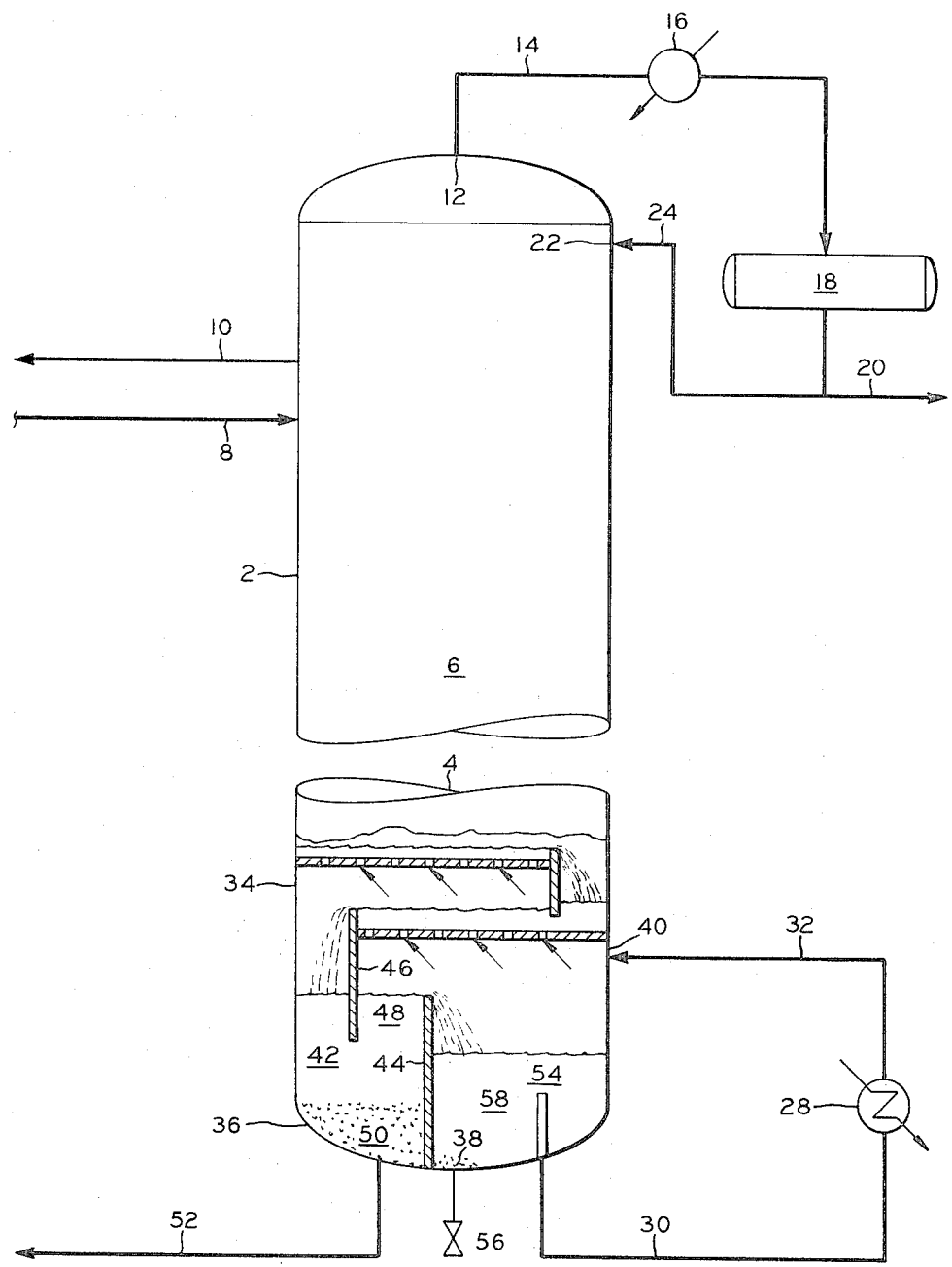
INVENTOR.
J.H. RANDALL
BY Young & Quigg
ATTORNEYS

PROCESS AND APPARATUS FOR FRACTIONATOR REBOILING WITH MINIMIZED FOULING BY CENTIFUGING AND DECANTING

This invention relates to a method and apparatus for reducing the fouling components contained in a fractionator liquid hydrocarbon effluent which is reboiled. In another aspect, the invention relates to a method and apparatus for removing an entrained catalyst phase from a liquid hydrocarbon effluent phase. In still another aspect, the invention relates to reboiler fouling control through the use of a partitioned fractionator bottom section.

Because of the favorable effects upon reaction kinetics, catalytic processes are widely used in chemical processes, particularly in the field of organic chemistry. The catalysts used in such processes can be soluble, heterogeneous, or vaporized in form. Regardless of the catalyst form, quite often the presence of the catalyst or catalyst residue in the reaction product is detrimental to further processing. Many of the catalysts which are employed in organic reactions tend to form complexes with the reaction product, or reactants which not only aggravate separation but also cause fouling of process equipment. The removal of these fouling catalyst components from the product stream is therefore desirable.

Hydrocarbon conversion processes, for example, alkylation of alkylatable hydrocarbons with olefins employing aluminum halide catalysts are known. These processes employ fractionator-reboiler apparatus for further refining purposes. Fractionator bottom sections have been arranged in various configurations depending upon the desired results. Exemplary of these results have varied from desulfurization in prevention of equipment fouling caused by hydrocarbon insoluble inhibitors, or other chemicals present in the fractionation zone. However, problems have continued to occur in view of the separation procedures known to the art, especially in the area of hydrocarbon insoluble catalyst fouling of fractionator reboilers.

It has now been discovered that the fouling of process equipment by entrained catalyst residue can be substantially reduced in systems wherein the residue forms a heavy immiscible phase with at least a portion of the reaction product. This reduction is achieved by passing the process stream or effluent carrying the fouling components downwardly into a first compartment and then essentially reversing the stream flow, thereby forming a lighter hydrocarbon phase layer and a heavier-centrifuged immiscible phase containing the fouling components. The lighter hydrocarbon phase is decanted to a second compartment while the heavier immiscible phase, containing entrained fouling components, is drawn off for treatment, for example, to a caustic treater. The lighter hydrocarbon phase is removed from above the bottom locus of the second compartment to the reboiler therein allowing further sludge sedimentation to the bottom of the second compartment.

An object of this invention is to provide a method and apparatus for removal of fouling components from reaction products. Another object of this invention is to provide an improved method and apparatus for reducing fouling components contained in a liquid reaction effluent which is reboiled. Another object of this invention is to provide a method and apparatus for defouling reboiler feeds of catalyst residue resulting in a material savings and a reduction in equipment maintenance costs. Other objects and advantages of this invention will become apparent to those skilled in the art from a study of the following disclosure, the accompanying drawing, and the appended claims.

The foregoing objects are realized broadly by charging the reactor effluent from the bottom tray of a fractionator column into a first chamber wherein a more dense, immiscible fouling phase separates from a less dense, liquid hydrocarbon phase, allowing separation and removal of undesired fouling components. The lighter hydrocarbon phase is decanted or overflowed into a second chamber wherein some additional immiscible phase separation occurs. The lighter hydrocarbon phase, substantially free of fouling components is removed through a conduit from the second chamber and charged to the reboiler. The small amounts of heavier immiscible phase or bottoms of the second chamber can be removed through a conduit in batch fashion. The immiscible phase containing catalyst residue is removed for caustic treatment and recovery purposes.

The process is particularly suited for defouling a fractionator-reboiler charge of entrained catalytic residue, for example, separating from an alkylate the entrained aluminum chloride complex. Specifically, in a diisopropyl alkylation process, hydrocarbon effluent from a reactor-settler system which is fed to a product fractionator contains entrained aluminum halide-hydrocarbon complex. The aforementioned complex tends to foul the fractionator reboiler and reduce the reboiler capacity. To reduce the chance for fouling, the liquid hydrocarbon downflow from the bottom tray of the fractionator column is directed downward to a first compartment and then essentially reversed in direction, promoting the centrifugal separation of the heavier immiscible complex phase which can be withdrawn from the lighter liquid hydrocarbon phase. The lighter hydrocarbon liquid phase is overflowed into a second compartment before being withdrawn to the reboiler. The withdrawal from the second compartment is made from a zone several inches above the bottom of the second compartment to further avoid entraining any heavier catalyst complex present in the second compartment bottom locus.

Before the development of the invention discussed hereinabove, fractionator reboiler fouling occurred in very short time periods, less than one month, requiring standby reboiler equipment. Normally two reboilers in parallel have been used, one on stream while the other was being de-fouled and out of service. The aforementioned arrangement was required to ensure continuous fractionation without plant shutdown. The apparatus and method developed herein allows the use of a single reboiler having up to 6 months service before cleanout is required.

The attached schematic drawing further illustrates and describes the invention. In the drawing is shown a fractionator column, a condenser, an accumulator, and an external reboiler with the appropriate communicative conduits.

Referring to the drawing in detail, a fractionator column 2 containing the usual vapor-liquid contacting trays is illustrated with the cylindrical bottom section 4 separated from the major tray portion 6 of column 2. Hydrocarbon feed, for example, from an alkylation process is introduced into column 2 through conduit 8. A liquid hydrocarbon stream comprising mainly liquid isobutane is taken off through conduit 10. A vapor stream comprising low-boiling paraffins is removed from the columns top locus 12 through conduit 14 to a condenser 16 before being passed into an accumulator 18. Hydrocarbons having three carbon atoms or less per molecule, are removed from the system through conduit 20 with the remaining condensed liquids being returned to the upper end portion 22 of column 2 through conduit 24.

The fractionator column cylindrical bottom section 4 communicates with an external reboiler 28 through defouled product conduit 30 and vapor return conduit 32. The fractionator cylindrical bottom section 4 has an upper end portion 34, a lower end portion 36, and a bottom locus 38. A hydrocarbon liquid effluent containing entrained catalyst residue overflows downwardly from the fractionator bottom tray 40 into a first compartment 42 formed by a first partition 44. A second partition or downcomer 46 extends downwardly from the tray 40 into the first compartment 42 forming a divided upper portion 48 of the first compartment 42. The first compartment 42 has a lower portion 50 which communicates with a product hydrocarbon and concentrated immiscible phase removal conduit 52. The lighter hydrocarbon liquid phase, now leaner in reboiler fouling materials, is passed over the first partition 44 into a second compartment 54 having a removal drain 56 communicating with the columns bottom locus 38 for removal of any remaining fouling material. The lean hydrocarbon phase substantially free of reboiler-contaminating components, is removed from the second compartment 54 through a conduit means 30. The lean hydrocarbon phase removal conduit communicates with the second compartment 54, middle portion 58, several inches above the bottom locus 38. Reboiler vapor conduit 32 enters the fractionator bottom section 4 below the bottom tray 40, thereby completing the fractionator, defouling, reboiler cycle.

In a preferred embodiment, the apparatus of the present invention involves a frationator-reboiler combination wherein a fractionator having an external thermosiphon reboiler 28 communicating with the lower end portion 36 and the upper end portion 34 of the fractionator bottom section 4. The improvement of this invention over the art provides, in combination, a substantially vertical first partition 44 extending upwardly from the zone's lower end portion 36 forming a first compartment 42 and a second compartment 54. A second partition or downcomer 46 which is axially offset from the first partition 44, extends downwardly from the zone's upper end portion wherein the second partition or downcomer 46 is attached to a horizontal fractionator tray 40. The configuration of the tray 40 and the second partition 46 forms the downcomer passage from the tray into the first compartment 42. A conduit means 52 is provided for recovering the catalyst fouling residue immiscible phase from the lower end portion 50 of the first compartment 42. Another conduit means 56 is provided for removing additional catalyst residue immiscible phase from the bottom locus 38 of the second compartment 54. A lighter hydrocarbon phase removal conduit 30 is provided which communicates with the second compartment 54 and the reboiler 28. A vapor return conduit 32 communicating from the reboiler 28 to the upper end portion 34 of the fractionator bottom section 4 provides re-entry of the lighter hydrocarbons phase to a vapor space below the tray 40.

Any conventional tray 40 can be used, for example, bubble tray, sieve tray, plate tray, etc.

The following table is provided to further illustrate the invention through calculated material and energy data typical of a fractionator-defouler-reboiler process and apparatus disclosed hereinabove.

TABLE

Fractionator Tower Temperature in °F

| Top (12) | 107 |
| Hydrocarbon feed (8) | 145 |
| Bottom (52) | 318 |

Fractionator Tower Pressure (p.s.i.a.)

| Bottom Section | 157 |
| Feed (8) Composition | Wt. % |
| Propane and lighter | 10.6 |
| Isobutane | 76.9 |
| Normal butane | 0.9 |
| Isopentane and heavier | 11.6 |
| Wt. % $AlCl_3$ Complex in | |
| Feed (8) | 3.00 |
| Reboiler (30) | 0.05 |
| Bottom (52) | 24.0 |

Reasonable variation and modification are possible within the scope of the foregoing disclosure, drawing, and the appended claims to the invention, the essence of which is a reduction of reboiler fouling by catalyst residue contained in the liquid product of a fractionator column. The aforementioned essence is achieved by arranging the bottom zone of the fractionator column into a specific apparatus configuration of compartments and overflow baffles wherein is provided a catalyst residue immiscible phase separation from the lighter hydrocarbon phase.

I claim:

1. A process for minimizing fractionator reboiler fouling in a fractional distillation system having a fractionator, comprising:

downflowing a fractionator liquid hydrocarbon effluent containing entrained reboiler fouling components into a first compartment of the fractionator defined by the bottom of the fractionator;

reversing the direction of the liquid hydrocarbon effluent in the first compartment and centrifuging downwardly through the first compartment to the bottom of the fractionator to separate a heavier immiscible phase containing said entrained reboiler fouling components;

withdrawing from the system the heavier liquid phase containing said entrained reboiler fouling components from the bottom of the first compartment;

decanting a lighter hydrocarbon phase from the first compartment into a second compartment, said second compartment being contiguous with said first compartment;

withdrawing an upper portion of the separated lighter hydrocarbon phase from the second compartment for reboiling;

heating and vaporizing at least a portion of the withdrawn lighter hydrocarbon phase; and returning the resulting, partially vaporized, lighter hydrocarbon phase to the second compartment.

2. A process according to claim 1 wherein the liquid hydrocarbon effluent results from an alkylation reaction and the heavier reboiler fouling components are comprised of aluminum chloride complex.

3. A process according to claim 2 wherein the liquid hydrocarbon effluent results from a diisopropyl alkylation system.

4. In a fractionating apparatus having walls, a bottom section below a fractionating zone, and a reboiler communicating with said bottom section, the improvement comprising:

a first partition substantially vertically positioned in the bottom section at a location spaced from an axis of the apparatus and separating the bottom section into a first compartment and a second larger compartment;

a bubble tray extending across the apparatus at an elevation higher than the first partition and opening into said first compartment;

a second partition being in a plane substantially parallel to the axis of the first partition and being connected to the bubble tray and extending downwardly therefrom into the first compartment to an elevation lower than an upper edge of the first partition;

means for disposing of material from a lower portion of the first compartment of the apparatus, said means comprising a first conduit connected to an opening formed through the apparatus and being in communication with the first compartment at about the lowermost elevation of said first compartment;

means for removing fluid from the second compartment at a location about medium the elevation of the first partition and passing said fluid to the reboiler, said means comprising a second conduit connected to the reboiler and to a wall of the apparatus and being in fluid communication with the second compartment at a location about medium the elevation of the first partition; and means for passing fluid from the reboiler to the apparatus.

5. An apparatus, as set forth in claim 4, wherein the fluid passes from the reboiler into the second compartment.

6. An apparatus, as set forth in claim 4, wherein the reboiler is a thermosiphon reboiler.

* * * * *

UNITED STATES PATENT OFFICE
CERTIFICATE OF CORRECTION

Patent No. 3,766,021          Dated October 16, 1973

Inventor(s) John H. Randall

It is certified that error appears in the above-identified patent and that said Letters Patent are hereby corrected as shown below:

Column 5, line 13, delete "bubble" and insert --contacting--; line 18, delete "bubble" and insert -- contacting ---.

Signed and sealed this 23rd day of July 1974.

(SEAL)
Attest:

McCOY M. GIBSON, JR.
Attesting Officer

C. MARSHALL DANN
Commissioner of Patents